Dec. 22, 1970  N. L. BROWN  3,549,989
MEASURING APPARATUS INCLUDING MEANS FOR AMPLITUDE
MODULATING A CONDUCTIVITY SIGNAL
WITH A TEMPERATURE SIGNAL
Filed July 27, 1967  4 Sheets-Sheet 1
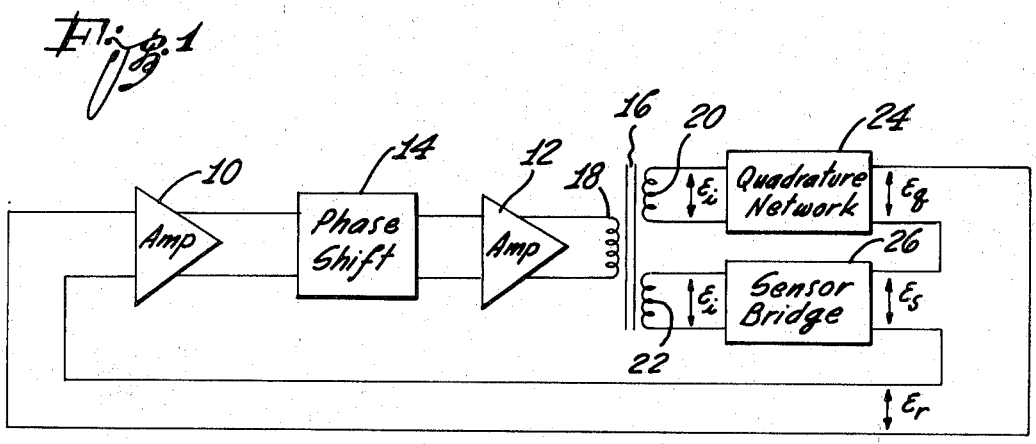
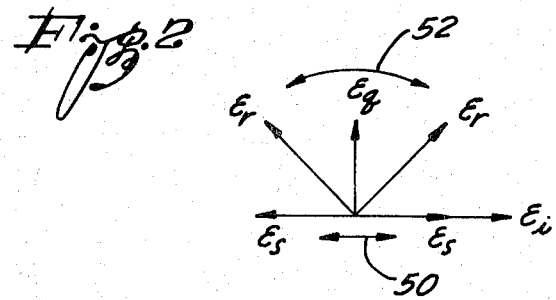
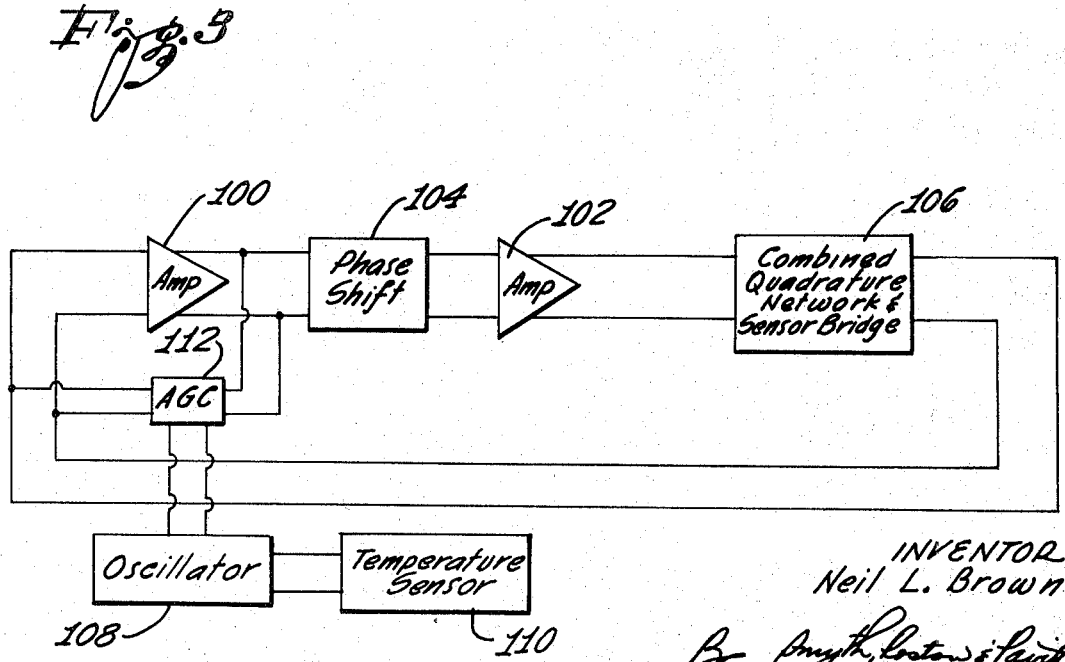
INVENTOR:
Neil L. Brown
ATTORNEYS

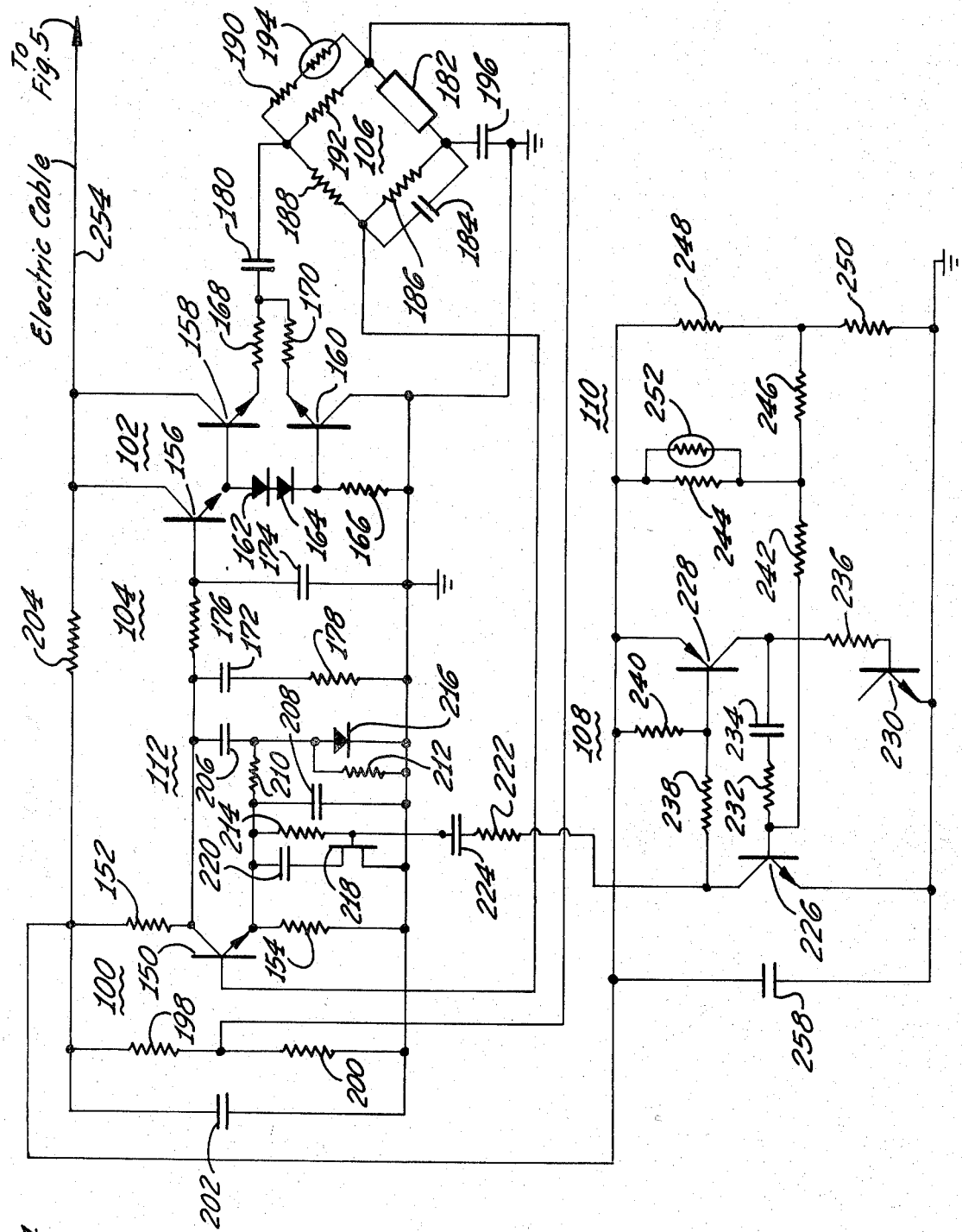

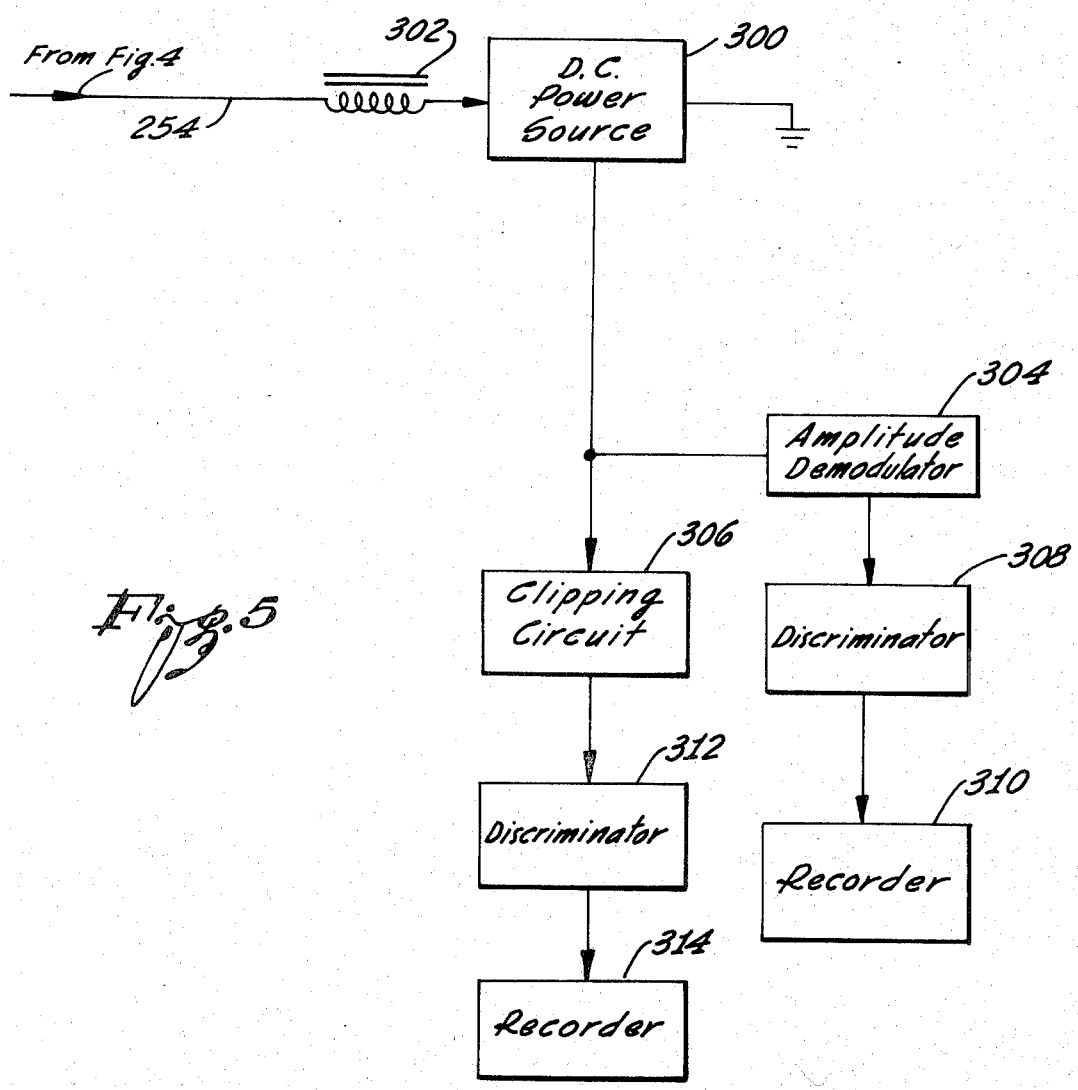

Dec. 22, 1970  N. L. BROWN  3,549,989
MEASURING APPARATUS INCLUDING MEANS FOR AMPLITUDE
MODULATING A CONDUCTIVITY SIGNAL
WITH A TEMPERATURE SIGNAL
Filed July 27, 1967  4 Sheets-Sheet 4
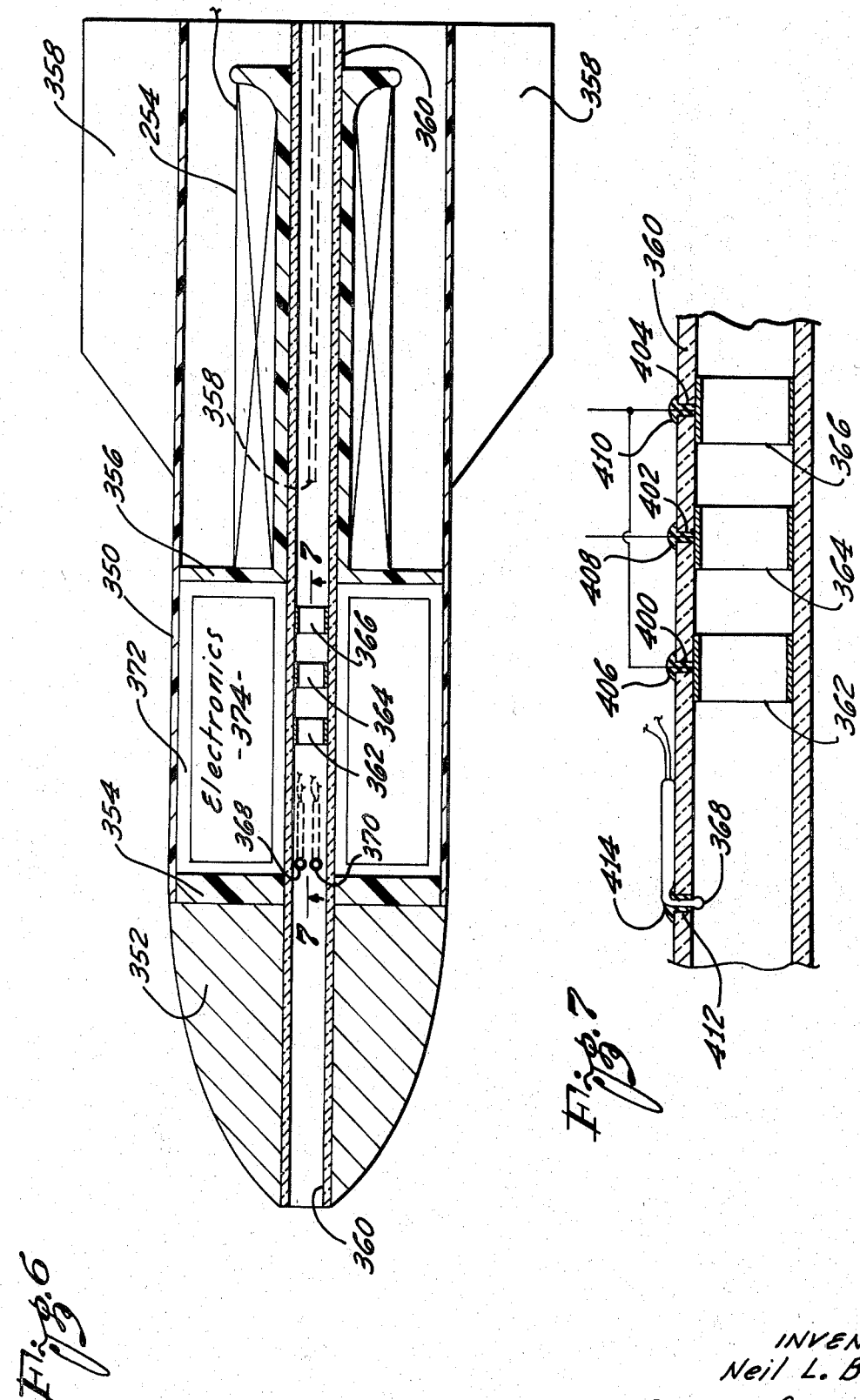
INVENTOR:
Neil L. Brown
ATTORNEYS United States Patent Office
3,549,989
Patented Dec. 22, 1970

3,549,989
MEASURING APPARATUS INCLUDING MEANS FOR AMPLITUDE MODULATING A CONDUCTIVITY SIGNAL WITH A TEMPERATURE SIGNAL
Neil L. Brown, El Cajon, Calif., assignor to The Bissett-Berman Corporation, Santa Monica, Calif., a corporation of California
Filed July 27, 1967, Ser. No. 656,430
Int. Cl. G01n 27/42
U.S. Cl. 324—30          14 Claims

ABSTRACT OF THE DISCLOSURE

This invention relates to an expendable sensor unit. Specifically, the invention relates to an expendable sensor unit which may be used to provide for a measurement of salinity and temperature at various depths as the sensor unit freely drops downward through the sea water. The sensor unit includes a conductivity sensor and a temperature sensor, both supported on a tube of insulating material, and wherein the conductivity sensor produces a first variable frequency signal and wherein the temperature sensor produces a second variable frequency sensor. An output signal is produced by amplitude modulating the first variable frequency signal with the second variable frequency signal and wherein the means for producing the first variable frequency signal may be a phase shift oscillator including a combination bridge which produces both the sensor component and the quadrature component.

---

The study of the physical properties of the various oceans of the world is becoming increasingly important. Two of the most important parameters of the ocean to be monitored are the salinity and the temperature of the ocean at various depths of the ocean. The instruments which were developed initially for measuring many of the physical parameters of the ocean were relatively bulky and expensive and could be used only in a laboratory environment. For example, salinity was initially measured by taking samples of the sea water at various depths and with a subsequent laboratory titration of the samples. It soon became apparent that this above method of measuring salinity was too expensive and time consuming.

It has been appreciated that the salinity of the sea water is dependent upon the conductivity of the sea water. This relationship between salinity and conductivity is not exact since there are various errors in the relationship produced by the temperature of the sea water, the pressure of the sea water, and other factors. These errors in the measurement of salinity by the measurement of conductivity have been eliminated using particular methods of compensation. For example, U.S. Pat. No. 3,419,396, issued Dec. 31, 1968, and application Ser. No. 631,053, filed on Apr. 14, 1967, both in the name of Neil L. Brown and both assigned to the same assignee as the instant application, illustrate measurement systems for providing measurement of the salinity of the sea water. In these measurement systems shown in the copending applications, a variable frequency phase shift oscillator has been used which provides for a faithful transmission of the desired information to a receiving station such as a ship from a sensor unit. A full description of this novel phase shift oscillator is shown in Pat. No. 3,271,694, issued Sept. 6, 1966, with Neil L. Brown as the inventor.

Although the above-mentioned systems provide for very accurate measurements of the salinity and temperature of the sea water, the systems including the sensor units are essentially used while the receiving station, such as the ship, is in a fixed position. However, it is often desirable to provide for the measurement of salinity and temperature of the sea water while the ship is moving. It is impractical to drag the ordinary sensor unit through the water since this would usually not allow for the taking of the measurements of salinity and temperature of the sea water at various depths. It has, therefore, been proposed to use expendable sensor units which are released from the moving ship and which drop at a relatively constant rate through the water. The sensor unit includes a transmission and power cable which uncoils as the sensor drops so that there is no drag on the sensor unit as it drops through the water. Also, the ship includes a combination of the transmission cable which uncoils as the ship moves away from the release point of the sensor unit so that the ship does not produce a drag on the cable. Such a system for an expendable sensor unit is shown in Pat. No. 3,221,556, issued Dec. 7, 1965. The present invention is directed to a particular expendable sensor unit which may be released from the ship and wherein the expendable sensor unit is relatively inexpensive in cost yet transmits highly accurate salinity and temperature information.

The present invention uses a unique phase shift oscillator having a combination bridge element which provides for an output signal which includes both a sensor component and a 90° phase shift or quadrature component. The value of the sensor component of the output signal is determined by the output from a conductivity sensor which measures the conductivity of the sea water. Since the conductivity of the sea water varies mainly in accordance with the temperature of the sea water, the conductivity sensor is temperature compensated by a temperature sensor which is included in the combination bridge. The output from the phase shift oscillator is, therefore, a variable frequency signal having a range of frequencies in accordance with the characteristics of the conductivity sensor. As indicated above, the temperature sensor provides for a temperature compensation of the conductivity sensor so that the output from the phase shift oscillator is an accurate representation of the salinity of the sea water.

In order to provide for temperature information, a second temperature sensor having variable characteristics is positioned to monitor the temperature of the sea water and wherein the second temperature sensor controls a second oscillator which produces a second variable frequency signal having a range of frequencies in accordance with the temperature of the sea water. In a preferred embodiment of the invention, the first range of frequencies related to salinity is significantly higher than the second range of frequencies related to temperature. For example, the first range of frequencies may be from 800 to 1200 cycles per second while the second range of frequencies may be from 60 to 90 cycles per second.

Since the sensor unit of the present invention is expendable and is transmitting its information to a moving ship, it is desirable to keep the weight of the connecting cable between the ship and the sensor unit as light as possible. It is, therefore, desirable that the salinity and temperature information provided by the conductivity and temperature sensors be combined so that the information may be transmitted over a single cable. The combining of the information is accomplished by amplitude modulating the first variable frequency signal with the second variable frequency signal so that the first variable frequency signal acts as a carrier for the second variable frequency signal.

Since all the information transmitted by the sensor unit is in the form of an alternating signal, the cable used to transmit the information from the sensor unit to the ship may also be used to send power from the ship to the sensor unit so as to power the sensor unit. The present invention makes it possible to use a single cable to provide for the complete transmission of power and information to and from the sensor unit.

The expendable sensor unit shown as an example in the present invention includes an elongated tube of insulating material open at both ends. The tube of insulating material extends from the front to the back of the sensor unit. The sensor unit also includes inner chambers to contain the electronics and the cable. As the sensor unit falls through the water, the tube of insulating material receives a continuous flow of sea water through the tube. At least a pair of conductive surfaces are disposed on the inner surface of the tube of insulating material so as to form a conductive sensor.

As the sea water flows through the tube, the resistance between the pair of conductive surfaces provides for a measurement of the conductivity of the sea water. In addition, a pair of temperature sensors may extend into the tube of insulating material in the path of the flow of sea water so as to provide for a measurement of the temperature of the sea water. One of the temperature sensors may be used to temperature compensate the conductivity sensor so as to provide for a more accurate measurement of salinity, whereas the other temperature sensor is used to provide for a measurement of the temperature of the sea water.

The present invention, therefore, provides for an inexpensive expendable sensor unit which may be used to measure the salinity and temperature of the sea water at various depths and to transmit the information to a moving ship. The expendable sensor unit of the present invention uses a single cable between the ship and the sensor unit to both supply power to and receive information from the sensor unit. Since the expendable sensor unit of the present invention is relatively inexpensive, it is actually cheaper to discard these expendable sensor units after making the desired measurements as opposed to stopping the ship and making measurements using the normal recoverable measurement instruments. A clearer understanding of the present invention will be had with reference to a particular embodiment disclosed in the following description and drawings wherein:

FIG. 1 is a block diagram of a prior art phase shift oscillator which is used in explaining the phase shift oscillator of the present invention;

FIG. 2 is a vector diagram of voltages appearing at different positions in a phase shift oscillator of the type shown in FIG. 1;

FIG. 3 is a block diagram of a measurement system constructed in accordance with the present invention and including a phase shift oscillator having a combined quadrature network and sensor bridge;

FIG. 4 is a detailed schematic of the measurement system of FIG. 3;

FIG. 5 is a block diagram of a receiving system which may be located on board ship to receive and demodulate the information transmitted by the measurement system of FIGS. 3 and 4;

FIG. 6 is a cross-sectional view of the packaging of the measurement system as shown in FIG. 4 into an expendable sensor unit; and FIG. 7 is a detailed cross-sectional view taken along line 7—7 of FIG. 6 showing the construction of the conductivity and temperature sensors.

In FIG. 1, a block diagram of a prior art phase shift oscillator is shown, which is essentially similar to the phase shift oscillator described in Pat. No. 3,271,694, issued Sept. 6, 1966, with Neil L. Brown as the inventor. The phase shift oscillator of FIG. 1 has an output freqency which is controlled by the ratio of the output voltage to the input voltage of a sensor bridge. The control of the frequency of the phase shift oscillator of FIG. 1 is accomplished by exciting the sensor bridge and a quadrature network from the output of a phase shift network and by then applying the sum of the outputs of the sensor bridge and the quadrature network to the input of the phase shift network. Using a phase shift oscillator of the type shown in FIG. 1, it is possible to obtain large variations in frequency for relatively small changes within the sensor bridge. In addition, the frequency of the output from the phase shift oscillator of the type shown in FIG. 1 is very stable.

In FIG. 1, the phase shift oscillator includes a pair of amplifiers 10 and 12 flanking a phase shift network 14. The output from the amplifier 12 is applied to a transformer 16. The transformer 16 includes a primary winding 18 and a pair of secondary windings 20 and 22. The outputs from the secondary windings 20 and 22 are the same and both outputs are represented by the voltage $E_i$. The secondary windings 20 and 22 are coupled to the quadrature network 24 and the sensor bridge 26. The outputs from the quadrature network and sensor bridge are represented by the voltages $E_q$ and $E_s$.

The output voltages from the quadrature network 24 and the sensor bridge 26 are summed together to produce a voltage $E_r$ and the voltage $E_r$ is applied as the input to the amplifier 10. The phase shift oscillator of FIG. 1 will oscillate at the frequency where the sum of the phase shift between the voltage $E_i$ and the voltage $E_r$ and the phase shift between the input and the outputs of the phase shifting network 14 totals 180°. The frequency of the phase shift oscillator of FIG. 1 changes in accordance with changes in the output $E_s$ from the sensor bridge and the output from the sensor bridge may be varied in accordance with a physical quantity to be measured.

In FIG. 2, a vector diagram is shown which illustrates the change in the magnitude and phase of the voltage $E_r$ in accordance with changes in the magnitude of the voltage $E_s$. As can be seen in FIG. 2, the input voltage $E_i$ is shown to lie along the horizontal axis. The output voltage $E_s$ from the sensor bridge 26 may vary in magnitude and polarity as shown by the arrow 50 in accordance with the characteristics of the variable component of the sensor bridge but the output voltage $E_s$ also lies along the horizontal axis. The output $E_q$ from the quadrature network 24 is a fixed value and is at right angles to the output $E_s$ from the sensor bridge 26. The resultant voltage $E_r$ may vary in magnitude and phase as shown by the arrow 52. It can be seen, therefore, that small changes in the magnitude of the voltage $E_s$ may produce large changes in the phase of the resultant voltage $E_r$. The changes in phase of the resultant voltage $E_r$ produce corresponding changes in the output frequency of the phase shift oscillator of the type shown in FIG. 1. A fuller description of the operation of the phase shift oscillator shown in FIG. 1 may be had with reference to Pat. No. 3,271,694, issued Sept. 6, 1966.

In FIG. 3, a block diagram of a measurement system constructed in accordance with the present invention is shown. The measurement system of FIG. 3 includes a phase shift oscillator. The phase shift oscillator of FIG. 3 includes a pair of amplifiers 100 and 102 flanking a phase shifter 104. This structure is similar to that shown in FIG. 1. However, in the system of FIG. 3, instead of the separate quadrature network 24 and sensor bridge 26 shown in FIG. 1, a combined quadrature and sensor bridge 106 is used. The output from the combination bridge 106 is then applied to the input to the amplifier 100. In the system of FIG. 3, the sensor and quadrature components of the signal from the bridge 106 are now interdependent instead of independent as is shown in FIG. 1, but the system of FIG. 3 is significantly simpler and less expensive than the system of FIG. 1.

The measurement system of FIG. 3 also includes means for the measurement of a second physical quantity such as temperature in addition to the measurement of the first physical quantity which is provided by the combined quadrature and sensor bridge. The first physical quantity may be a measurement of salinity. The additional measurement of the temperature is provided for by a second oscillator 108 and the frequency of the output from the second oscillator 108 is controlled by a temperature sensor 110. The amplifier 100 includes a feedback path having an automatic gain control circuit 112 so as to stabilize the amplifier 100. The output from the oscillator 108 may be used to control the level at which automatic control circuit 112 stabilizes the amplifier 100 so as to amplitude modulate the output of the amplifier 100 in accordance with the output from the oscillator 108.

The system of FIG. 3, therefore, provides for a pair of variable frequency signals, with the first variable frequency signal produced by the oscillator structure including the amplifiers 100 and 102, the phase shifter 104 and the combined quadrature and sensor bridge 106, and with the second variable frequency signal provided by the oscillator 108 as controlled by the temperature sensor 110. The second variable frequency signal produced by the oscillator 108 may then be used to amplitude modulate the first variable frequency signal produced by the phase shift oscillator structure through the control of the automatic gain control unit 112. The system of FIG. 3, therefore, provides for a pair of variable frequency signals and using one variable frequency signal to amplitude modulate the other variable frequency signal so as to produce a single information signal containing both variable frequency signals.

In FIG. 4, a detailed schematic of the system of FIG. 3 is shown. In FIG. 4, the amplifier 100 of FIG. 3 may be provided by the transistor 150 and includes biasing resistors 152 and 154. The amplifier 102 of FIG. 3 as shown in FIG. 4 may include three transistors 156, 158 and 160, a pair of diodes 162 and 164, biasing resistor 166 and summing resistors 168 and 170.

The phase shift network 104 of FIG. 3 as shown in FIG. 4 may include capacitors 172 and 174 and resistors 176 and 178. The phase shift network of FIG. 4 including the resistor 178 has a response over a broader range of frequencies than a T phase shift network without the resistor 178. The output from the amplifier 100 is coupled to the phase shifter 104 and the output from the phase shifter 104 is supplied to the amplifier 102. The output from the amplifier 102 is then passed through a coupling capacitor 180 to the combination sensor-quadrature bridge 106.

The combination bridge 106 includes a sensor arm which includes a conductivity sensor 182 and a 90° phase shift or quadrature arm which includes a capacitor 184 and a resistor 186. The other two arms of the bridge 106 include resistive elements. For example, one arm includes a resistor 188 and the other arm includes three resistors 190, 192 and 194. The resistor 194 may be a temperature sensor which senses the temperature of the sea water and has a variable resistance in accordance with the temperature of the sea water. The temperature sensor 194 is used to provide for a temperature compensation of the conductivity sensor 182. When the conductivity sensor 182 is accurately temperature compensated, the output from the bridge 106 may be an accurate representation of the salinity of the sea water. A capacitor 196 is coupled between the bridge 106 and a reference potential such as ground. It is to be noted that the reference potential such as ground may be a sea ground.

The combination bridge 106 is relatively simple in construction in comparison with the separate quadrature and sensor bridges of the prior art. Although in the prior art the separate bridges provided for an independence between the operation of the bridges, it also necessitated the use of additional components which added to the complexity and expense of the system. The use of the combination bridge 106 shown in FIG. 4, therefore, provides for a simpler and less expensive measurement system than the prior art systems. The output from the bridge 106 is applied between the base of the transistor 150 and a junction in a voltage divider including a pair of resistors 198 and 200. A capacitor 202 is connected across the resistors 198 and 200. The resistors 198 and 200 extend between the source of power and the reference potential such as ground. A resistor 204 may be used in series in the supply line between the amplifiers 100 and 102.

The system shown in FIG. 4 also includes an automatic gain control circuit 112 so as to stabilize the output signal from the amplifier 100. The automatic gain control circuit includes a coupling capacitor 206, a parallel capacitor 208, three resistors 210, 212 and 214 and a diode 216. Also, the automatic gain control circuit 112 includes a unijunction transistor 218 and a coupling capacitor 220.

The output from the collector of the transistor 150 is fed through the capacitor 206 and is controlled so that an appropriate value is applied to the base of the unijunction transistor 218 to control the unijunction transistor. The unijunction transistor 218 in turn controls the output from the transistor 150. As the voltage at the base of the unijunction transistor 218 varies, the output from the transistor 150 also varies. The unijunction transistor 218 is adjusted so as to provide for an automatic gain control to stabilize the transistor 150.

In addition to the input to the unijunction from the output of the transistor 150, a second input may be supplied to the base of the unijunction transistor 218 so as to provide for a change in the level of stabilization of the transistor 150. In the circuit as shown in FIG. 4, the base of the unijunction transistor 218 is controlled by the output of an external oscillator 108, which output is fed through a resistor 222 and a coupling capacitor 224. The oscillator 108 may be of the blocking type and includes a pair of interconnected transistors 226 and 228. A third transistor 230 may be connected so as to operate as a diode.

The output from the transistor 228 is coupled through a resistor 232 and a capacitor 234 to the base of the transistor 226. In addition, a resistor 236 is connected between the base of the transistor 230 and the collector of the transistor 228. Also, a resistor 238 is connected between the collector of the transistor 226 and the base of the transistor 228. A biasing resistor 240 may be used to bias the base of the transistor 228. The voltage on the base of the transistor 226 may be controlled by a voltage dividing network including resistors 242, 244, 246, 248 and 250 and variable resistor 252.

The variable resistor 252 may be a temperature sensor such as a thermistor of the same type as the temperature sensor 194. The thermistors 194 and 252 are both responsive to the temperature of the sea water. As the temperature of the sea water changes the resistance of the thermistor 252 changes, thereby varying the resistance in the voltage-dividing network, so as to vary the voltage on the base of the transistor 226. The change in the voltage on the base of the transistor 228 provides a change in the frequency output of the oscillator 126 which, in turn, is reflected by a change in the voltage on the base of the unijunction transistor 218.

The changes in the voltage on the base of the unijunction transistor 218 provides for an amplitude modulation of the variable frequency signal produced by the phase shift oscillator. The information signal, therefore, consists of a first variable frequency signal having characteristics in accordance with the salinity of the sea water and wherein the first variable frequency signal is amplitude modulated by a second variable frequency signal having characteristics in accordance with the temperature of the sea water. The information signal is supplied from the sensor unit through the sea cable 254. In addition, power is also supplied to the sensor unit over the cable 254. The information signal from the sensor unit is alternating current while the power to the sensor unit is direct current so that the single cable 254 may be used. The power is also supplied to the oscillator 108. A capacitor 258 may be used so as to filter out any undesired alternating current.

FIG. 5 illustrates a block diagram of a system for demodulating the information transmitted by the sensor unit of FIG. 4. In FIG. 5, the information is received from the cable 254, which is the same cable 254 shown in FIG. 4. Power is supplied to the cable 254 from a D-C power source 300. The D-C power is connected through a low-pass filter 302 to the cable 254. The low-pass filter 302 allows for the passage of the D-C power to the cable 254 but does not allow the passage of A-C information from the cable into the D-C power source. The D-C power source 300 may also be connected to a reference potential such as ground and the ground may be the same sea ground used with the system of FIG. 4.

The A-C information signal transmitted over the cable 254 is applied to an amplitude demodulator 304 and a clipping circuit 306. The amplitude demodulator 304 demodulates the information signal so as to remove the first variable frequency signal representing the salinity information which acts as a carrier and to produce at the output of the demodulator 304 the second variable frequency signal which represents the temperature information. As indicated above, the temperature information may have a frequency range between 60 and 90 cycles per second. The variable frequency signal from the amplitude demodulator is applied to a discriminator 308 which produces a variable amplitude signal having variations in accordance with the variations in frequency of the variable frequency signal applied to the discriminator 308. The variable amplitude signal which represents the temperature of the sea water may be applied to a standard recorder 310 such as a pen recorder.

As indicated above, the information signal on the cable 254 is also applied to the clipping circuit 306. The clipping circuit 306 clips the signal to remove the amplitude modulations. The output from the clipping circuit 306 is applied to a frequency discriminator 302 which produces a variable amplitude signal having variations in accordance with the variations in the frequency of the variable frequency signal applied to the discriminator 312. The variations in frequency of the signal applied to the discriminator 312 are in accordance with the variations in salinity of the sea water. The range of frequencies of the signal applied to the discriminator 312 may range between 800 to 1200 cycles per second. The output from the discriminator 312 has amplitude characteristics in accordance with the salinity of the sea water, and this signal may be recorded on a recorder 314, which again may be a standard pen recorder. Actually, the recorders 310 and 314 may be combined in a single double-pen recorder so as to provide for a single graphic record of both the salinity and temperature information of the sea water.

The expendable sensor unit shown in FIG. 4 may be packaged in the form shown in FIG. 6. In FIG. 6, the expendable sensor unit includes an outer housing 350 which may be composed of an insulating material such as a plastic material. The forward end or nose portion 352 of the housing 350 may support a heavy weight. For example, the nose portion 352 may be constructed of a heavy material such as cast iron. An insulating support member 354 extends across the housing 350 in abutting relation to the nose portion 352. In addition, a spool member 356 which may also be constructed of an insulating material extends across the housing 350 to provide support for the housing. The spool member 356 extends back from the central portion of the housing 350 so as to support the cable 254 shown in FIGS. 4 and 5. The cable 254 is allowed to exit from the rear of the housing which is open so as to uncoil from the spool as the sensor unit shown in FIG. 6 drops through the water. The outer housing 350 may also include outwardly extending stabilizing fins 358 which stabilize the sensor unit as it drops through the water.

The sensor unit shown in FIG. 6 also includes an elongated tube of insulating material 360 which extends through the sensor unit. The tube 360 is open at both ends and the tube passes through the nose portion 352, the insulating member 354 and the insulating spool 356. The tube of insulating material 360, therefore, allows for a continuous flow of sea water through the tube as the sensor unit drops through the water.

The insulating tube supports the various sensors which are responsive to the physical conditions of the sea water. For example, the tube of insulating material 360 supports three conductive surfaces 362, 364 and 366 which are formed as conductive rings on the inner surface of the tube of insulating material. Since these conductive surfaces 362–366 are in contact with the sea water, they are composed of a relatively inert conductive material such as platinum. The tube of insulating material 360 also may support a pair of temperature sensors 368 and 370. The sensors 368 and 370 extend into the tube of insulating material to be in contact with the sea water so as to be responsive to the temperature of the sea water as it flows through the tube 360. The various sensors may be connected so as to operate with the electronics of FIG. 4. An inner chamber 372 which surrounds the sensor units and is located between the insulating members 354 and 356 is used in the electronics of FIG. 4. The electronics of FIG. 4 may be represented by the box 374.

FIG. 7 illustrates in more detail the construction of the various sensors which are supported by the tube of insulating material 360. As can be seen in FIG. 7, the conductive surfaces 362, 364 and 366 are formed as rings disposed on the inside surface of the tube of insulating material 360. As indicated above, since these conductive surfaces are in contact with the sea water, they are composed of a relatively inert conductive material such as platinum. The output wires from the conductive surfaces which form the conductivity sensor are disposed through openings 400, 402 and 404 in the wall of the tube of insulating material 360. It is noted that the two outside conductive surfaces 362 and 366 are electrically interconnected. The electrical interconnection of the two outside conductive surfaces prevents any current flow external to the tube of insulating material 360 and confines all the current flow between the conductive surfaces 362 and 366 and the intermediate conductive surface 364. The wire from the conductive surfaces may be supported by the use of insulating material 406, 408 and 410.

The temperature sensor 368 may be a thermistor which is encased in a protective insulating casing. The thermistor is disposed through an opening 412 in the wall of the tube of insulating material 360 so that the head portion of the thermistor 368 extends within the tube of insulating material 360 so as to be in contact with the sea water and responsive to the temperature of the sea water which flows through the tube. The body of the thermistor 368 may lie on the outside surface of the tube of insulating material 360, and the opening 412 may be sealed by insulating material 414 which secures the body of the thermistor 368 to the tube of insulating material 360.

The second temperature sensor 370 shown in FIG. 6 may also be a thermistor which is secured to the tube of insulating material 360 in a manner similar to that of the temperature sensor 368. As indicated with reference to FIG. 4, one thermistor provides for temperature compensation of the conductivity sensor so as to provide for an accurate measurement of the salinity of the sea water and the other temperature sensor is used to provide for a direct reading of the temperature of the sea water.

The present invention, therefore, includes a novel expendable sensor unit which may be used to measure the salinity and temperature of sea water from a moving ship and wherein the measurements are taken at various depths as the expendable unit freely drops through the sea water. The various sensors may be included on a tube of insulating material so as to provide for a continuous flow of sea water through the expendable sensor unit. It is to be noted that in accordance with the construction of the expendable sensor unit as shown in FIGS. 6 and 7, the sensors are located in an internal position and are protected from external forces so that large objects brushing against the sensor unit will not harm the sensor elements.

The sensors control oscillators so as to produce a first frequency signal which is used to amplitude modulate a second frequency signal to provide a single output information signal. The information is then fed from the sensor unit over a single cable which also carries the power to the sensor unit so as to reduce the cost and simplify the construction of the sensor unit. The main oscillator may be a phase shift type which includes a combination sensor and quadrature bridge so as to again simplify and lower the cost of the expendable sensor unit of the present invention.

The present invention, therefore, is directed to a unique expendable sensor unit which is simple in construction and inexpensive in cost but which provides for reliable and accurate information such as the salinity and temperature of sea water.

Although the present invention has been described with reference to a particular embodiment, it is to be appreciated that adaptations and modifications of this embodiment may be made and the invention is only to be limited by the appended claims.

What is claimed is:

1. In an oceanography telemetry system for transmitting information in response to physical characteristics of sea water,
    a conductivity sensor responsive to the conductivity of the sea water,
    first means coupled to the conductivity sensor for producing a first variable frequency signal having a first range of frequencies in accordance with the conductivity of the sea water,
    a first temperature sensor responsive to the temperature of the sea water,
    second means coupled to the temperature sensor for producing a second variable frequency signal having a second range of frequencies in accordance with the temperature of the sea water, and
    third means coupled to the first and second means for amplitude modulating the first variable frequency signal with the second variable frequency signal to produce an output signal containing conductivity and temperature information.

2. In the oceanography telemetry system of claim 1 wherein the first range of frequencies is substantially higher in frequency than the second range of frequencies.

3. In the oceanography telemetry system of claim 1 additionally including a second temperature sensor responsive to the temperature of the sea water and coupled to the first means to temperature compensate the conductivity sensor to produce the first variable frequency signal having the first range of frequencies in accordance with the salinity of the sea water.

4. In an oceanography telemetry system for transmitting information in response to physical characteristics of sea water,
    a conductivity sensor having a variable resistance in accordance with the conductivity of the sea water,
    first phase shift oscillator means coupled to the conductivity sensor for producing a first variable frequency signal in accordance with the conductivity of the sea water,
    a first temperature sensor having a variable resistance in accordance with the temperature of the sea water,
    second oscillator means coupled to the temperature sensor for producing a second variable frequency signal in accordance with the temperature of the sea water, and
    third means coupled to the first and second means for amplitude modulating the first variable frequency signal with the second variable frequency signal to produce an output signal.

5. In the oceanography telemetry system of claim 4 wherein the first phase shift oscillator means includes a combination sensor and quadrature bridge.

6. In the oceanography telemetry system of claim 4 additionally including a second temperature sensor responsive to the temperature of the sea water and coupled to the first phase shift oscillator to temperature compensate the conductivity sensor to produce the first variable frequency signal in accordance with the salinity of the sea water.

7. In an oceanography telemetry system for transmitting information to a receiving station in response to physical characteristics of sea water,
    an expendable transmitting unit, including,
    a conductivity sensor responsive to the conductivity of the sea water,
    first means coupled to the conductivity sensor for producing a first variable frequency signal in accordance with the conductivity of the sea water,
    a temperature sensor responsive to the temperature of the sea water,
    second means coupled to the temperature sensor for producing a second variable frequency signal in accordance with the temperature of the sea water,
    third means coupled to the first and second means for amplitude modulating the first variable frequency signal with the second variable frequency signal to produce an output signal containing conductivity and temperature information, and
    cable means responsive to the output signal to transmit the output signal to the receiving station and with the cable means also transmitting electrical energy supplied by the receiving station to the transmitting unit.

8. In the oceanography telemetry system of claim 7 additionally including a second temperature sensor responsive to the temperature of the sea water and coupled to the first means to temperature compensate the conductivity sensor to produce the first variable frequency signal in accordance with the salinity of the sea water.

9. In the oceanography telemetry system of claim 7 wherein the conductivity and temperature sensors are variable resistances.

10. In the oceanography telemetry system of claim 7 wherein the conductivity sensor includes at least a pair of conductive surfaces exposed to the sea water.

11. In the oceanography telemetry system of claim 10 wherein the pair of conductive surfaces are positioned on the inside surface of a tube of insulating material and wherein the temperature sensor is positioned within the tube of insulating material and wherein the tube of insulating material receives a continuous flow of sea water.

12. An expendable sea water sensor unit, including:
    an elongated tube of insulating material to receive a continuous flow of sea water,
    a conductive sensor having variable characteristics in accordance with variations in the characteristics of the sea water,
    a pair of conductive surfaces disposed on the inside surface of the elongated tube of insulating material and connected to the conductive sensor to provide electrical terminals for the sensor,
    first oscillator means coupled to the conductive sensor to provide a first signal having a variable frequency in accordance with variations in the characteristics of the sensor,
    a first temperature sensor extending into the tube of insulating material and having variable characteristics in accordance with variations in the temperature of the sea water,
    second oscillator means coupled to the temperature sensor to provide a second signal having a variable frequency, in a different frequency range than the frequencies of the first signal, in accordance with the variations in the characteristics of the first temperature sensor,
    first means coupled to the first and second oscillator means for modulating one of the first and second signals with the other one of the first and second signals to produce an output signal, and cable means disposed within one of the inner chambers and coupled to the first means for transmitting the output signal through the sea water.

13. The expendable sea water sensor unit of claim 12 additionally including a second temperature sensor extending into the tube of insulating material and having variable characteristics in accordance with variations in the temperature of the sea water and coupled to the first oscillating means to compensate the frequency of the first signal in accordance with the variations in the temperature of the sea water.

14. An expendable sea water sensor unit, including:
an elongated tube of insulating material to receive a continuous flow of sea water,
a pair of conductive surfaces disposed on the inside surface of the elongated tube of insulating material to provide for a conductivity sensor having characteristics in accordance with the conductivity of the sea water,
first oscillator means coupled to the conductive sensor to provide a first variable frequency signal in accordance with the conductivity of the sea water,
a first temperature sensor extending into the tube of insulating material and with the temperature sensor having characteristics in accordance with the temperature of the sea water,
second oscillator means coupled to the temperature sensor to provide a second variable frequency signal in accordance with the temperature of the sea water,
first means coupled to the first and second oscillator means for producing an output signal having characteristics in accordance with the characteristics of the conductive sensor and the temperature sensor, and
cable means disposed within one of the inner chambers and coupled to the first means for transmitting the output signal, the first means providing for an amplitude modulation of the first variable frequency signal with the second variable frequency signal.

References Cited

UNITED STATES PATENTS

| | | | |
|---|---|---|---|
| 2,330,394 | 9/1943 | Stuart | 324—30X |
| 2,845,221 | 7/1958 | Vine et al. | 324—30UX |
| 2,901,327 | 8/1959 | Thayer et al. | 324—30UX |
| 3,147,431 | 9/1964 | Bennett et al. | 324—30X |
| 3,221,556 | 12/1965 | Campbell et al. | 324—1UX |
| 3,271,694 | 9/1966 | Brown | 331—66 |

OTHER REFERENCES

Hamon et al.: J. Sci. Instruments (Q184.J7), vol. 35, pp. 452–458, December 1958.

E. E. KUBASIEWICZ, Primary Examiner

U.S. Cl. X.R.

331—66; 340—207, 209